US011046244B2

(12) United States Patent
Ikeda et al.

(10) Patent No.: US 11,046,244 B2
(45) Date of Patent: Jun. 29, 2021

(54) VEHICLE INTERIOR LAMP

(71) Applicants: Yazaki Corporation, Tokyo (JP); NISSAN MOTOR CO., LTD., Yokohama (JP)

(72) Inventors: Takayuki Ikeda, Shizuoka (JP); Ken Suzuki, Shizuoka (JP); Tomoaki Sasaki, Kanagawa (JP); Kenichi Baba, Kanagawa (JP)

(73) Assignees: YAZAKI CORPORATION, Tokyo (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/910,352

(22) Filed: Jun. 24, 2020

(65) Prior Publication Data

US 2020/0317121 A1 Oct. 8, 2020

Related U.S. Application Data

(63) Continuation of application No. PCT/JP2018/047295, filed on Dec. 21, 2018.

(30) Foreign Application Priority Data

Dec. 27, 2017 (JP) .............................. JP2017-251112

(51) Int. Cl.
*B60Q 3/60* (2017.01)
*B60Q 3/51* (2017.01)
(Continued)

(52) U.S. Cl.
CPC ................. *B60Q 3/60* (2017.02); *B60Q 3/51* (2017.02); *B60Q 3/74* (2017.02); *B60Q 3/76* (2017.02);
(Continued)

(58) Field of Classification Search
CPC .... B60Q 3/60; B60Q 3/74; B60Q 3/76; F21V 5/045; F21Y 2113/17
See application file for complete search history.

(56) References Cited

U.S. PATENT DOCUMENTS

| 2006/0007689 A1* | 1/2006 | Okabe | B60Q 3/74 |
| | | | 362/351 |
| 2013/0026504 A1* | 1/2013 | Marx | F21S 41/19 |
| | | | 257/88 |

(Continued)

FOREIGN PATENT DOCUMENTS

| JP | 2002-002375 A | 1/2002 |
| JP | 2009-006853 A | 1/2009 |
| JP | 2016-221984 A | 12/2016 |

*Primary Examiner* — Evan P Dzierzynski
(74) *Attorney, Agent, or Firm* — Sughrue Mion, PLLC

(57) ABSTRACT

A vehicle interior lamp includes a housing having an opening, a lens arranged at the opening, a compartment provided in the housing and surrounding the opening at which the lens is arranged, a light source arranged in a corner of the compartment and emitting light toward the lens, and a reflector arranged inside the compartment, the reflector for introducing the light emitted from the light source to the lens. A plurality of steps is provided on a surface of the lens facing the light source, the steps having a thickness that reduces as the distance from the light source increases and arranged to be brought close uniformly a brightness of a surface of the lens by the light source. The lens is provided with a protrusion or a serration.

2 Claims, 5 Drawing Sheets

(51) Int. Cl.
*B60Q 3/76* (2017.01)
*B60Q 3/74* (2017.01)
*F21V 5/04* (2006.01)
*F21V 7/00* (2006.01)
*F21V 13/04* (2006.01)
*F21Y 113/17* (2016.01)
*F21Y 115/10* (2016.01)

(52) U.S. Cl.
CPC ............... *F21V 5/045* (2013.01); *F21V 7/00* (2013.01); *F21V 13/04* (2013.01); *F21Y 2113/17* (2016.08); *F21Y 2115/10* (2016.08)

(56) References Cited

U.S. PATENT DOCUMENTS

2016/0091167 A1\* 3/2016 Watanabe ................ B60Q 3/76
    362/331
2018/0216799 A1\* 8/2018 Inoue ..................... F21V 15/01

\* cited by examiner

VEHICLE INTERIOR LAMP

CROSS-REFERENCE TO RELATED APPLICATIONS

The present application is a continuation of International Application No. PCT/JP2018/047295, filed on Dec. 21, 2018, and based upon and claims the benefit of priority from Japanese Patent Application No. 2017-251112, filed on Dec. 27, 2017, the entire contents of which are incorporated herein by reference.

TECHNICAL FIELD

The disclosure relates to a vehicle interior lamp attached to an interior ceiling of a vehicle.

BACKGROUND

Various vehicle interior lamps of this type have been proposed before (see JP 2016-221984 A and JP 2002-002375 A). One example of existing vehicle interior lamps includes a housing attached to the interior ceiling of a vehicle, a switch knob provided on a lower side of the housing, a lens provided on the lower side of the housing, and a light source such as a light-emitting diode arranged inside the housing.

The vehicle interior lamp illuminates the interior of the vehicle by light projected from the light source, the light emitted through the lens. When the lens is a room light lens, it is necessary to make the light emit from the entire area of the lens as uniformly as possible. In existing vehicle interior lamps, therefore, a plurality of light sources are arranged, or a light guide plate is integrally arranged inside the room light lens.

SUMMARY

Existing vehicle interior lamps use a plurality of light sources or a light guide plate integrally arranged inside the room light lens to emit light from the entire area of the room light lens as uniformly as possible. However, in this case, the light-emitting surface of such a room light lens has a monotonous appearance, while there are demands for decorative illuminations.

The present application was made to solve the problem noted above, and it is an object of the application to provide a vehicle interior lamp that can enhance the design properties of the light-emitting surface of a room light lens through highlighting of protrusions or serrations on the room light lens when light is emitted.

A vehicle interior lamp according to some embodiments includes a housing having an opening, a lens arranged at the opening, a compartment provided in the housing and surrounding the opening at which the lens is arranged, a light source arranged in a corner of the compartment and emitting light toward the lens, and a reflector arranged inside the compartment, the reflector for introducing the light emitted from the light source to the lens. A plurality of steps is provided on a surface of the lens facing the light source, the steps having a thickness that reduces as the distance from the light source increases and arranged to be brought close uniformly a brightness of a surface of the lens by the light source. The lens is provided with a protrusion or a serration.

The vehicle interior lamp according to some embodiments can enhance the design properties of the light-emitting surface of the lens by the protrusion or serration provided to the lens being highlighted when light is emitted from the lens.

DETAILED DESCRIPTION

Figure 1:
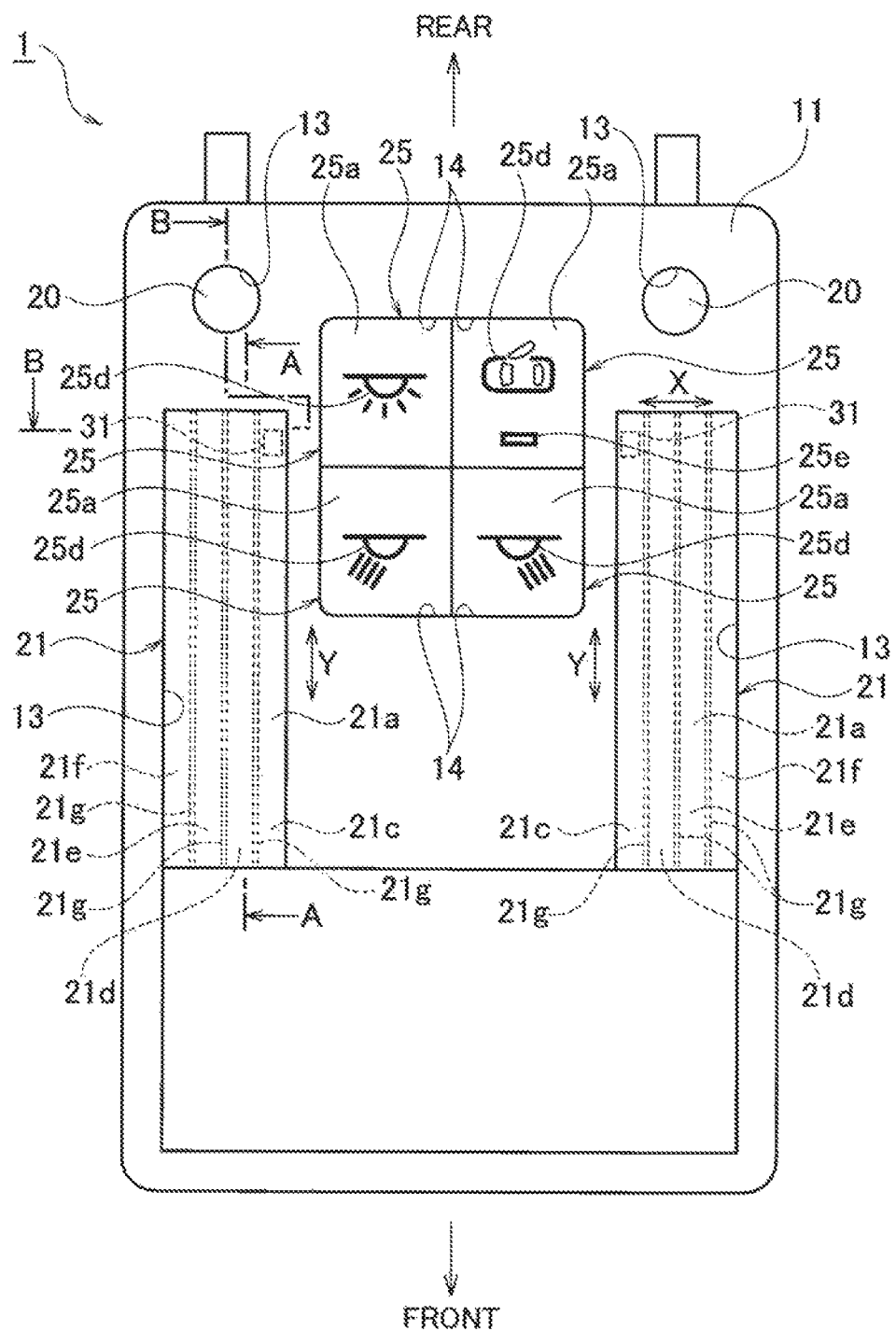
FIG. 1 illustrates a vehicle interior lamp according to an embodiment as viewed from a vehicle interior when one looks up at an interior ceiling.

One embodiment will be described below with reference to the drawings.

FIGS. 1 to 5 illustrate the embodiment. A map lamp 1 that is a vehicle interior lamp according to the embodiment is attached to a point on an interior ceiling 2 more to front than front seats of a vehicle.

The map lamp 1 includes a housing 10 attached to the interior ceiling 2, a pair of left and right spot light lenses 20 and a pair of left and right room light lenses 21 arranged on a lower side of the housing 10, a plurality of switch knobs 25 arranged on the lower side of the housing 10, and a substrate 30 arranged inside the housing 10.

The housing 10 is made of a material that does not transmit light (e.g., opaque synthetic resin). The housing 10 includes a housing main body 11, and a ceiling-side housing part 12 assembled to the housing main body 11 and covering the ceiling side of the housing main body 11. The housing main body 11 is provided with a plurality of light-shielding partition walls 11a. A plurality of first openings 13 and a plurality of second openings 14 are formal on the lower side of the housing main body 11 where compartments defined by the plurality of light-shielding partition walls 11a each opening.

The ceiling-side housing part 12 is provided with a mounting part (not illustrated) for attachment to the interior ceiling 2.

The spot light lenses 20 and the room light lenses 21 are arranged such as to close the first openings 13. Each of the spot light lenses 20 is circular with a small surface area exposed to the vehicle interior. Each of the room light lenses 21 is square-shaped with a large surface area exposed to the vehicle interior.

Figure 3:
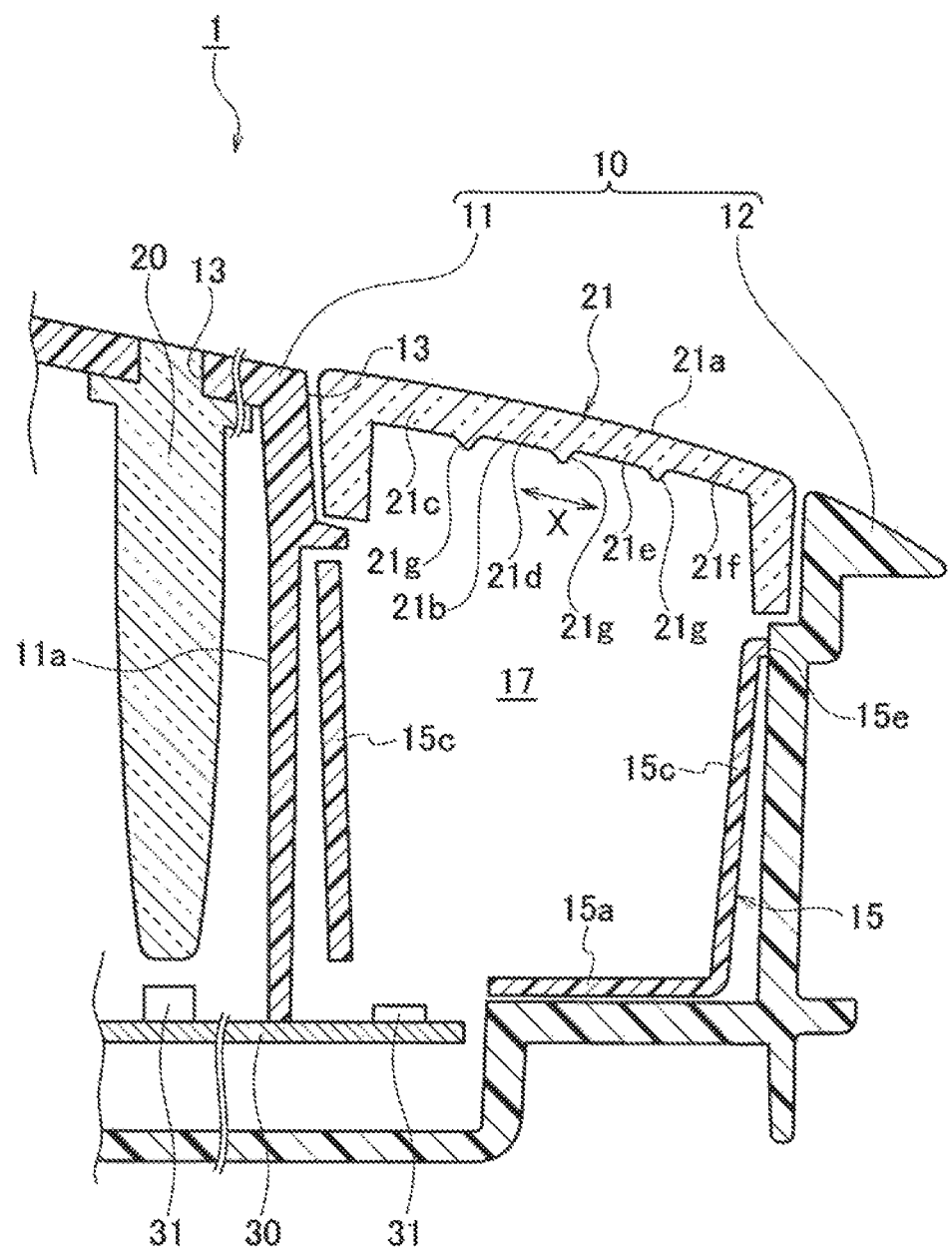
FIG. 3 is a cross-sectional view along line B-B in FIG. 1.

Each of the room light lenses 21 is made of synthetic resin and opaque white in color, and have a curved light-emitting surface (front side) 21a with a predetermined curvature. As illustrated in FIG. 3, each of the room light lenses 21 is formed with a plurality of (four in the embodiment) steps 21c, 21d, 21e, 21f that reduce in thickness stepwise along a direction X orthogonal to the longitudinal direction Y of the lens 21 on a light receiving side (back side) 21b that is the side facing the light source, the thickness reducing as the distance from a three-color light-emitting diode (light source) 31 increases. Protrusions 21g are formed along the boundaries extending in the longitudinal direction Y of the lens 21 between adjacent ones of these steps 21c, 21d, 21e, 21f. Namely, the back side 21b is formed to change in shape stepwise (in a step-like manner) in which each of the plurality of steps 21c, 21d, 21e, 21f reduces in thickness according to the distance from the three-color light-emitting diode 31.

Each of the switch knobs 25 is arranged such as to close a corresponding second opening 14 on the lower side of the housing main body 11. Each of the switch knobs 25 is a push switch knob. Each of the switch knobs 25 is made of a material that does not transmit light except for a symbol mark portion 25d. Each of the switch knobs 25 includes an operating part 25a exposed on the front side of the housing main body 11, a switch push rod (not illustrated) protruding into the housing main body 11, and a light-shielding wall (not illustrated) protruding into the housing main body 11.

Each operating part 25a is provided with the symbol mark portion 25d that is made of a light-transmitting material. Each symbol mark portion 25d bears a mark that allows visual recognition of the function that the corresponding switch knob 25 serves. One switch knob 25 additionally includes an indicator lens 25e along with the symbol mark portion 25d on the operating part 25a.

The substrate 30 is abutted on the upper sides of the light-shielding partition walls 11a of the housing main body 11. The substrate 30 closes the plurality of openings formed by the light-shielding partition walls 11a dividing the housing on the ceiling side (see FIG. 3). Namely, the illumination light from the three-color light-emitting diodes 31 is stopped from leaking to the ceiling-side housing part 12. The plurality of three-color light-emitting diodes (light sources) 31 and a plurality of switching devices SW and so on are mounted on the substrate 30. Each of the three-color light-emitting diodes 31 is arranged in each of the regions divided by the light-shielding partition walls 11a corresponding to each of the spot light lenses 20, room light lenses 21, and each of the switch knobs 25, respectively. For the switch knob 25 having the indicator lens 25e, a three-color light-emitting diode 31 is arranged in the region corresponding to the indicator lens 25e, in addition to that of the symbol mark portion 25d.

Each of the three-color light-emitting diodes 31 includes therein a red (R) light-emitting element, a green (G) light-emitting element, and a blue (B) light-emitting element, and emits light of a predetermined color in accordance with a current value, for example.

Each of the switching devices SW is arranged directly below the switch push rod (not illustrated) of a corresponding switch knob 25.

Next, the parts where light is emitted from the room light lenses 21 will be described.

Figure 2:
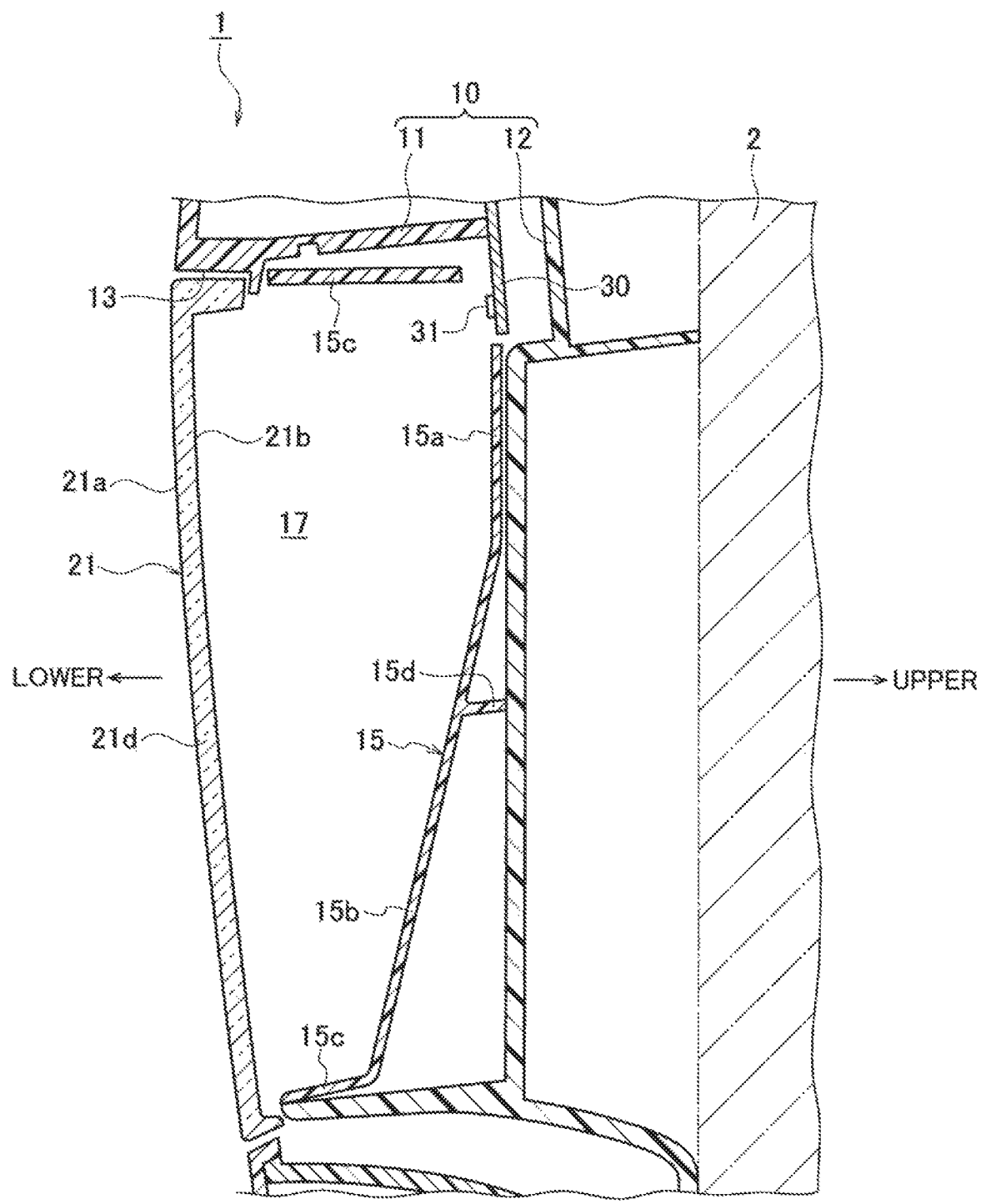
FIG. 2 is a cross-sectional view along line A-A in FIG. 1.

As illustrated in FIGS. 2 and 3, inside the housing 10 is formed a compartment 17 that surrounds the first opening 13 at which the room light lens 21 is arranged. The three-color light-emitting diode 31 is arranged in a corner of the compartment 17. In the compartment 17 is arranged a box-shaped reflector 15 having a reflection surface that reflects light from the three-color light-emitting diode 31. The reflector 15 has a shape illustrated in FIGS. 4 and 5. The surface of the reflector 15 is coated in white color that has high reflectivity or with aluminum by vapor deposition to be reflective. The reflector 15 is arranged to extend over all the inner surfaces of the compartment 17. More specifically, the reflector 15 includes a flat surface part 15a arranged along the ceiling surface of the compartment 17, a slope part 15b positioned on the ceiling side of the compartment 17, and side face parts 15c arranged along all the side faces of the compartment 17. The flat surface part 15a is parallel to the surface of the room light lens 21 and positioned in a region of the ceiling surface near the three-color light-emitting diode 31. The slope part 15b is inclined relative to the room light lens 21 (the slope part 15b is inclined toward the three-color light-emitting diode 31), and positioned in a region of the ceiling surface distanced from the three-color light-emitting diode 31.

Figure 4:
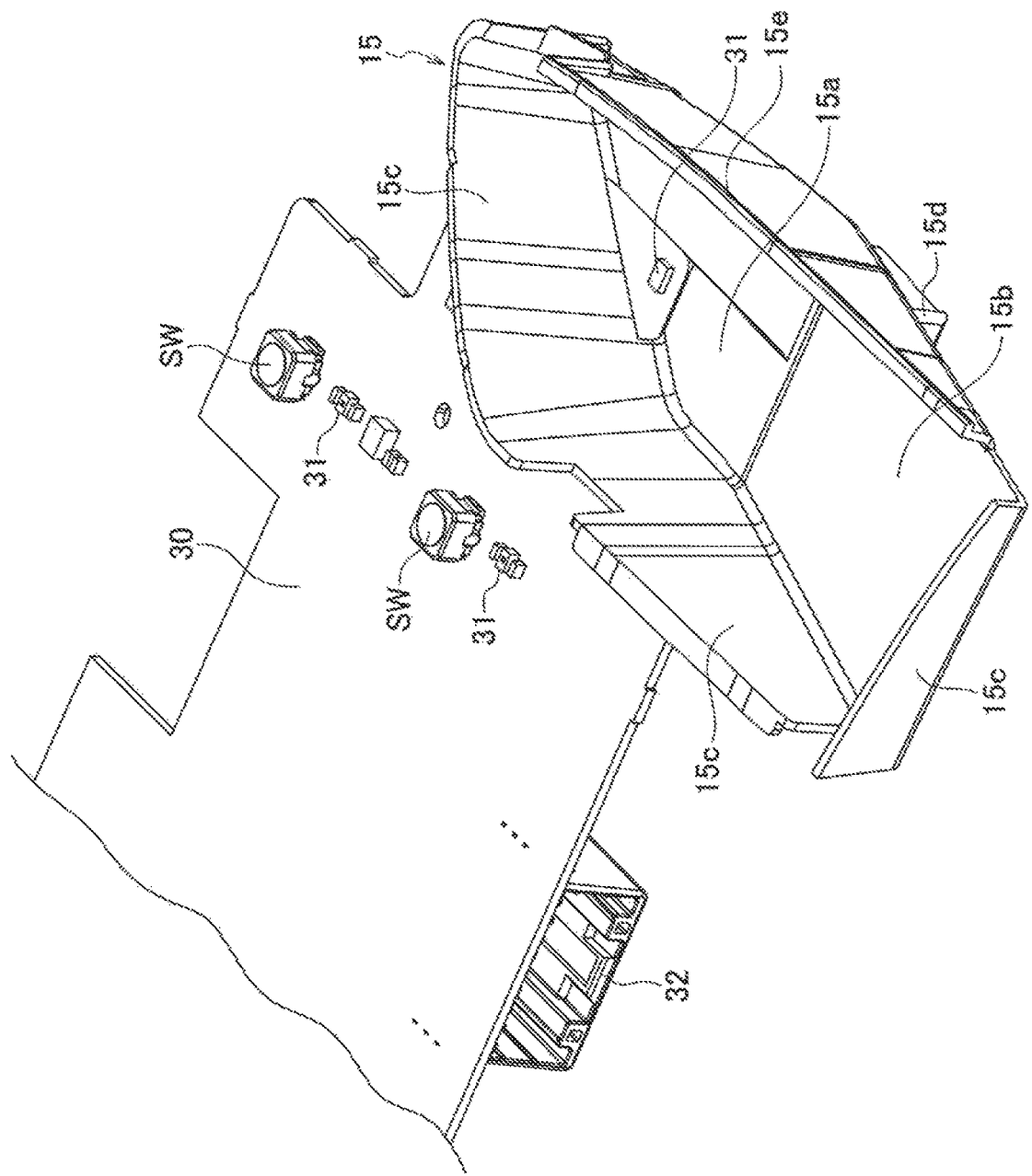
FIG. 4 is a perspective view of a reflector of the vehicle interior lamp according to the embodiment when viewed from the front side.
Figure 5:
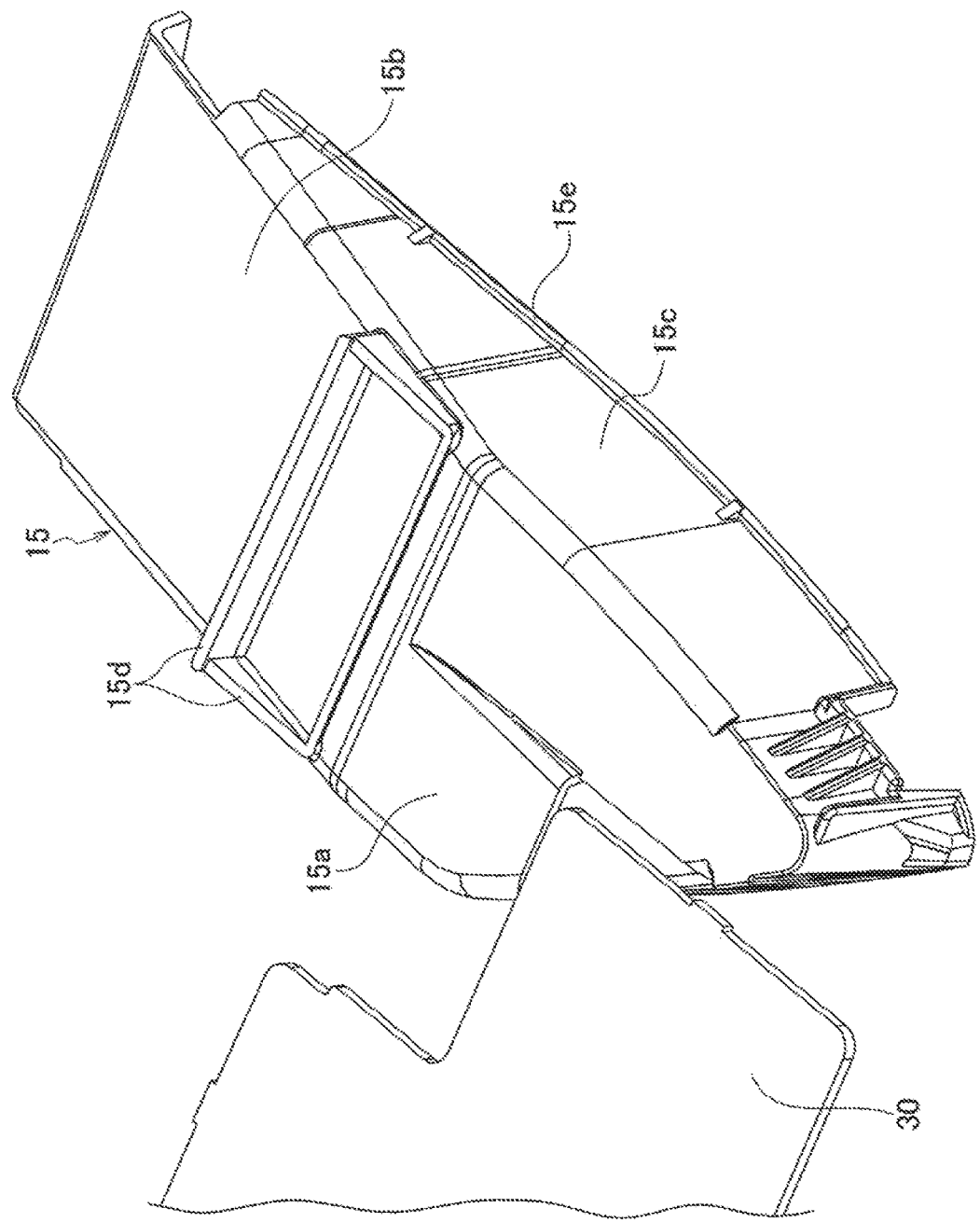
FIG. 5 is a perspective view of the reflector of the vehicle interior lamp according to the embodiment when viewed from the back side.

As illustrated in FIGS. 4 and 5, the reflector 15 is provided with an encircling rib 15d in the center on the back side of the slope part 15b, and a foreign matter proof rib 15e along upper edges on the back side of the side face parts 15c. The foreign matter proof rib 15e prevents foreign matter such as dust from entering the housing 10. The encircling rib 15d catches foreign matter such as dust falling on the slope of the slope part 15b and prevents the foreign matter from falling down below.

As described above, the map lamp 1 includes a housing 10 attached to the interior ceiling 2 of a vehicle and having the first opening 13, the room light lens 21 arranged at the first opening 13, the compartment 17 provided in the housing 10 and surrounding the first opening 13, the three-color light-emitting diode 31 arranged in a corner of the compartment 17 and emitting light toward the room light lens 21, and the reflector 15 arranged on an inner surface of the compartment 17. The plurality of steps 21c, 21d, 21e, 21f is provided on the back side 21b of the room light lens 21, their thickness decreasing as the distance from the three-color light-emitting diode 31 increases. The protrusions 21g are provided along the boundaries between adjacent ones of the steps 21c, 21d, 21e, 21f.

Therefore, while part of the light emitted from the three-color light-emitting diode 31 is directly projected to and transmits the room light lens 21 having differing thicknesses, other part of the emitted light is reflected once on the side face part 15c or the slope part 15b of the reflector 15, or reflected a plurality of times (scattered) before being projected to the room light lens 21. Thus, the three-color light-emitting diode 31 can emit light from the room light lens 21 as uniformly as possible over the entire area. Namely, the map lamp 1 can emit light uniformly from the entire area of the lens without increasing the amount of emitted light through use of a plurality of light sources, or without using a light guide plate, as with existing counterparts.

The reflector 15 in the map lamp 1 has the flat surface part 15a parallel to the surface of the room light lens 21 in a region of the ceiling surface near the three-color light-emitting diode 31, and the slope part 15b inclined relative to the surface of the room light lens 21 (the slope part 15b inclined toward the three-color light-emitting diode 31) in a region of the ceiling surface distanced from the three-color light-emitting diode 31.

In the map lamp 1, therefore, the region of the room light lens 21 distanced from the three-color light-emitting diode 31 is irradiated with reflection light from the slope part 15b. The slope part 15b thus contributes to uniform light emission from the entire area of the room light lens 21.

The light emitted from the three-color light-emitting diode 31 is bright straight in front, while the brightness decreases as the distance from the front increases. The brightness also decreases as the thickness of the room light lens 21 increases since less light can transmit, while the brightness increases as the thickness of the lens decreases. This is why the plurality of steps 21c, 21d, 21e, 21f is provided to the map lamp 1, so that the thickness on the back side 21b of the room light lens 21 is thicker in front of the three-color light-emitting diode 31 while it is thinner as the distance from the front increases. These steps 21c, 21d, 21c, 21f are formed such that the back side 21b changes in shape in a step-like manner in which the thickness decreases in accordance with the distance from the three-color light-emitting diode 31. This feature of the map lamp 1 allows the brightness (luminance) of the light-emitting surface 21*a* of each step 21*c*, 21*d*, 21*e*, 21*f* of the room light lens 21 to be uniform. Moreover, in the map lamp 1, the protrusions 21*g* are provided along the boundaries between each adjacent pair of the steps 21*c*, 21*d*, 21*e*, 21*f*. The light projected on and reflected by the reflector 15 is therefore scattered by the protrusions 21*g* at the boundaries where the thickness of the room light lens 21 changes so that the light is intensified. This feature of the map lamp 1 improves the appearance of the light-emitting surface (front side) 21*a* of the room light lens 21, and thus the design properties (decorative features) of the light-emitting surface (front side) 21*a* of the room light lens 21 can be enhanced.

In the map lamp 1, the reflector 15 is arranged to extend over all the inner surfaces of the compartment 17. Therefore, light is reflected wherever it is projected on the inner surfaces of the compartment 17 in the map lamp 1, so that light emitted from the three-color light-emitting diode 31 is projected to the room light lens 21 with high efficiency, which allows the room light lens 21 to emit bright light.

Moreover, the reflector 15 includes the encircling rib 15*d* in the center on the back side of the slope part 15*b*, and the foreign matter proof rib 15*e* along upper edges on the back side of the side face parts 15*c*. Therefore, foreign matter such as dust is prevented from entering the back side 21*b* of the room light lens 21. That is, an insertion hole or the like for a vehicle-side connector (not illustrated) to be connected to a connector 32 on the substrate 30 is opened in the ceiling-side housing part 12. Foreign matter such as dust could enter the housing 10 from such an opening, but the foreign matter proof rib 15*e* prevents any foreign matter such as dust from entering the housing 10, and even if foreign matter such as dust enters the housing 10, the encircling rib 15*d* catches the foreign matter and prevents it from falling down below.

The map lamp 1, which is the vehicle interior lamp according to the embodiment, is provided with protrusions 21*g* along boundaries between adjacent ones of the plurality of steps 21*c*, 21*d*, 21*e*, 21*f* formed on the light receiving side (back side) 21*b*, of the side facing the light source 31, of the room light lens 21, for enhancing the design properties of the light-emitting surface (front side) 21*a* of the room light lens 21 when light is emitted. Alternatively, serrations (not illustrated), or protrusions and serrations (not illustrated), may be provided instead of the protrusions 21*g*, to enhance the design properties of the light-emitting surface (front side) 21*a* of the room light lens 21 when light is emitted. Protrusions 21*g* also serve the function of increasing the rigidity of the room light lens 21.

What is claimed is:

1. A vehicle interior lamp, comprising:
   a housing having an opening;
   a lens arranged at the opening;
   a compartment provided in the housing and surrounding the opening at which the lens is arranged;
   a light source arranged in a corner of the compartment and emitting light toward the lens; and
   a reflector arranged inside the compartment, the reflector for introducing the light emitted from the light source to the lens, wherein
   a plurality of steps is provided on a first surface of the lens facing the light source, the steps having a thickness that reduces as the distance, in a direction normal to the optical axis of the light source, from the light source increases such that a brightness of a second surface of the lens, opposite the first surface of the lens, is brought into close uniformity, and
   the lens is provided with a protrusion or a serration.

2. The vehicle interior lamp according to claim 1, wherein the protrusion or serration is provided along a boundary between adjacent ones of the plurality of steps.

\* \* \* \* \*